UNITED STATES PATENT OFFICE.

ANGUS McLEOD AND ALEXANDER THOMAS McLEOD, OF BLOOMINGTON, ILLINOIS.

GRAIN-WEIGHING SCALE.

994,265.   Specification of Letters Patent.   Patented June 6, 1911.

Application filed June 14, 1909. Serial No. 502,037.

*To all whom it may concern:*

Be it known that we, ANGUS McLEOD and ALEXANDER THOMAS McLEOD, citizens of the United States, residing at Bloomington, in the county of McLean and State of Illinois, have invented an Improvement in Grain-Weighing Scales, of which the following is a specification.

Our invention is an improvement in that class of automatic scales, in which the grain or other material to be weighed is received into a stationary hopper and discharges therefrom into a vertically movable weighing-hopper which is so suspended and connected with pivoted weighted beams and other mechanism, that, when a certain load has been received, the weighing-hopper descends a little, whereby a valve controlling discharge from the receiving hopper into the weighing-hopper is closed, and then the gate at the bottom of the weighing-hopper is opened to allow the discharge of the grain or other material therefrom.

The object of our invention is to simplify and render more accurate, the construction and operation of scales of this class; and the details of construction, arrangement, and operation of our invention are as hereinafter described, and illustrated in the accompanying drawings, in which—

The frame A of the machine comprises vertical and parallel end portions which support a rectangular top portion within which the weighing-hopper C is hung and whereon the receiving hopper B is supported. The hopper B is divided into two compartments, the larger being indicated by 1 and the smaller by 2. The grain is discharged from the spout of the elevator into the larger compartment 1. The same is provided with a skeleton guard 3 composed of a series of parallel rods that extend across it at a downward inclination, their free ends resting on the upper edge of the partition 4 which separates the two compartments. The rods 3 serve to arrest straw and other similar trash or foreign matter, and to direct it into the smaller compartment 2. The partition 4 is inclined downward toward the rear side of the compartment 1 and its object is to insure a uniform stream of grain at the dribble point, that is to say, at the lower end or discharge point of the compartment 1; and this it will do irrespective of the irregularity of the stream of grain that may be delivered from the elevator spout.

Figure 2:
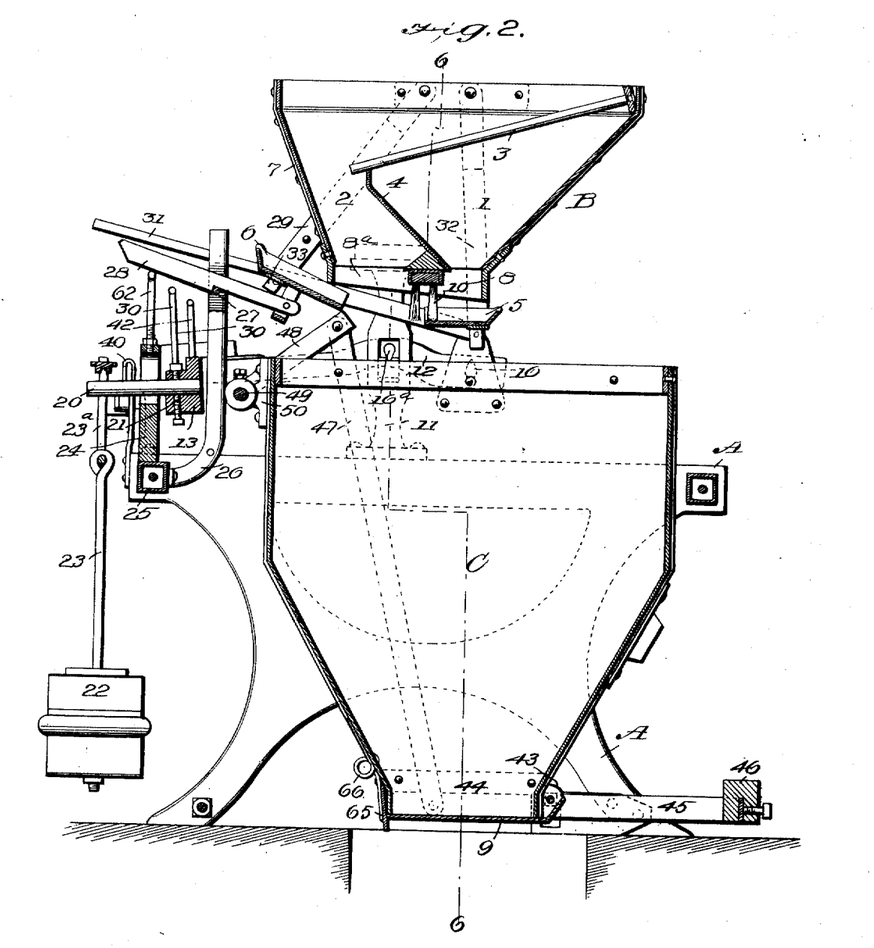
Fig. 2 is a central vertical transverse section of the same, the valve of the smaller compartment of the receiving hopper being shown open in both figures.
Figure 12:
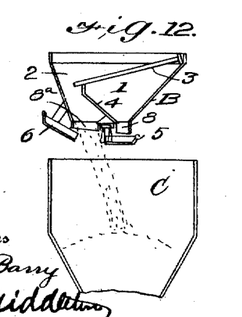
Figs. 12 and 13 are diagrammatic views showing the valves of the receiving hopper in the positions they respectively occupy in the first and last stages of the operation of the machine.

In the first stage of the operation of the machine, the valve 5 of the larger compartment 1 is closed and the valve 6 of the smaller compartment 2 is open, as shown in Fig. 2 and in the diagrammatic Fig. 12. The grain fills the compartment 1 and overflows therefrom, passing over the partition 4 into the smaller compartment 2, from which it discharges into the weighing-hopper C. It will be seen that the outer side 7 of this compartment, that is to say, the front side of the receiving hopper B, is arranged at a much less inclination than the opposite side of the hopper. In other words, it is at but a slight angle from the vertical. It is practically parallel to a line drawn from about the center of the weighing-hopper C as will be seen by reference to Figs. 2 and 12.

Figures 3, 4:
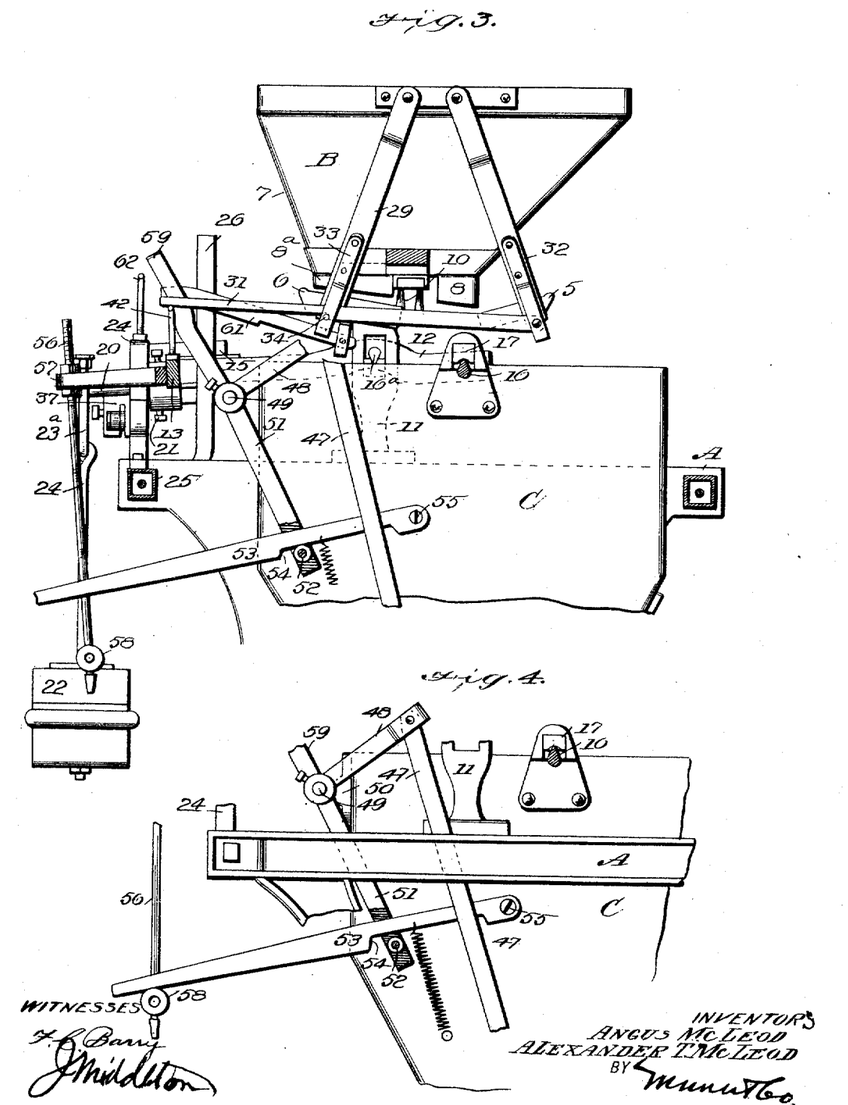
Fig. 3 is a sectional elevation of the upper portion of the scale showing the valve of the front and smaller compartment of the receiving hopper closed and the smaller or "dribble" valve open.
Fig. 4 is a sectional view of the upper portion of the weighing-hopper, showing the parts connected with the hinged gate of the same.
Figure 5:
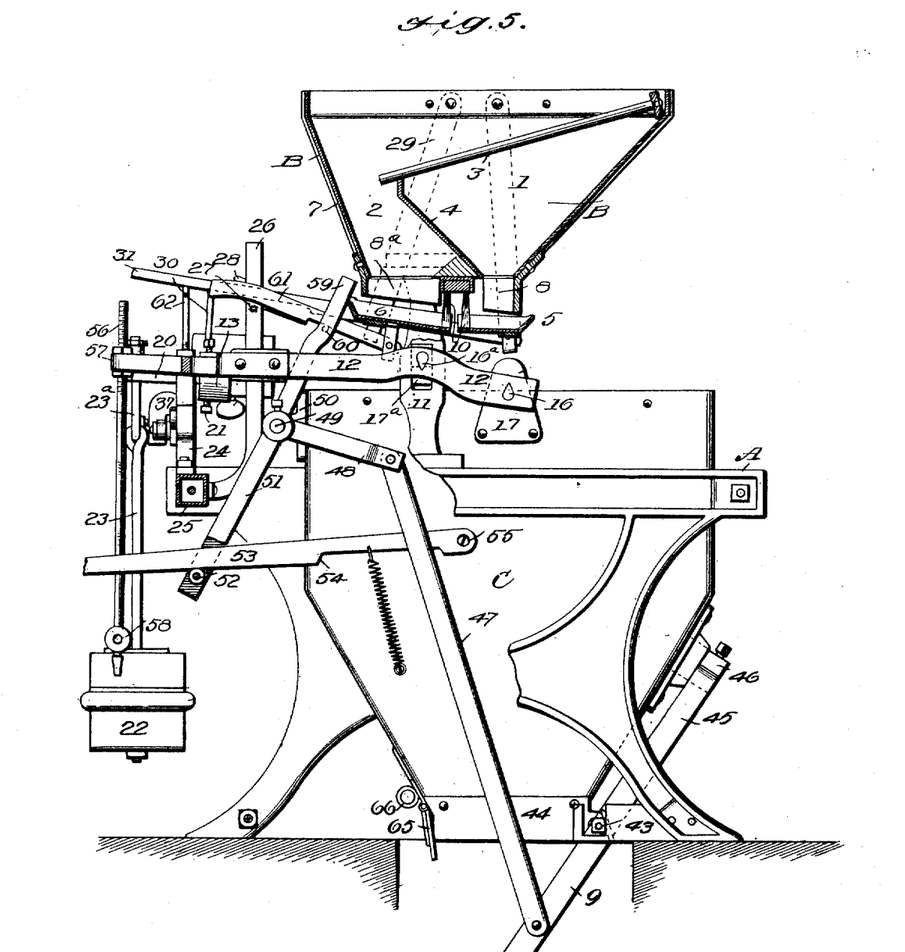
Fig. 5 is a combined side elevation and vertical section of the scale, showing both valves of the receiving hopper closed and the gate of the weighing-hopper open.
Figure 6:
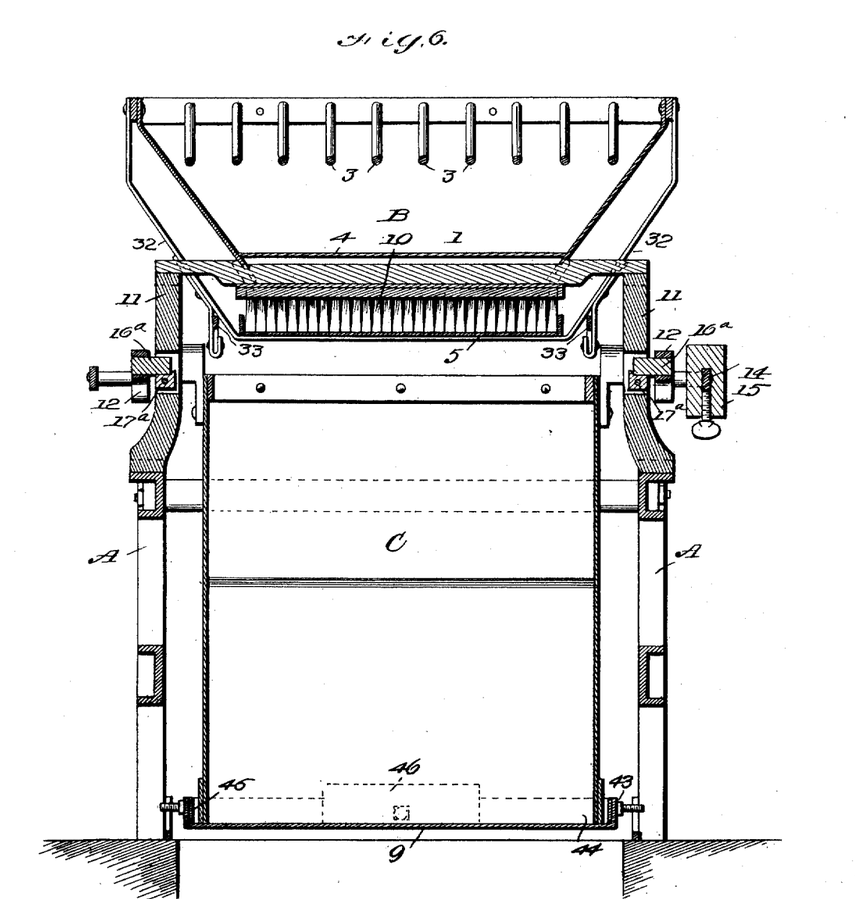
Fig. 6 is a vertical section on the line 6—6 of Fig. 2.
Figure 13:
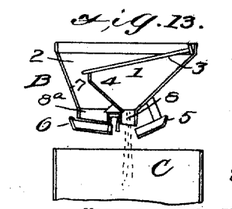

The object of this arrangement is to cause the grain to be delivered as nearly as possible at the center of the weighing hopper C so that the latter will maintain its balance or vertical position while receiving grain, so that its downward movement will be without any avoidable friction. The discharge opening 8 of the larger compartment 1, see Figs. 2 and 5, is directly over the center of the weighing-hopper so that grain discharged therefrom as shown by dotted lines Fig. 13, will strike the middle of the initial load received by said hopper. When the machine is set for operation, the valve 5 is closed as previously stated, see Figs. 2 and 12, and the valve 6 of the adjoining compartment is open, and, so soon as the larger compartment fills, the overflow into the smaller compartment 2 discharges into the weighing-hopper C until the accumulated weight therein is sufficient to cause its initial depression. In other words, it descends slightly, and then halts to receive the final load. With the initial movement of the weighing-hopper C, the valve 6 of the smaller compartment is closed, as will be further described, and the valve 5 of the larger compartment 1 is opened as shown in Figs. 3 and 13. Owing to the narrow discharge opening 8 of the compartment 1, the discharge of the reserve, or "dribble," is slow compared with the free discharge from the larger opening 8$^a$ of the compartment 2, and hence the weighing-hopper is slowly filled until it contains the desired load, whereupon it descends farther, and the discharge gate 9, which normally closes its lower end, is opened as shown in Fig. 5. A brush 10, see Figs. 2, 5, 6, is arranged underneath the receiving hopper B and between the mouths or discharge opening 8 and 8$^a$ of its respective compartments. The valves 5 and 6 of the two compartments 1, 2, when in closed position shown in Fig. 5, are in contact with the lower sides of this brush. In other words, the brush serves as a guard and grain-stop for the open discharge side of each of the valves, preventing grain or other material from overflowing the inner edges of the valves when closed.

Figure 9:
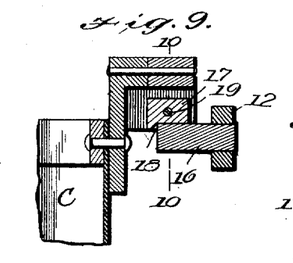
Fig. 9 is a vertical section of one of the bearings of the weighing-hopper, the same being taken on the line 9—9 of Fig. 10.
Figure 10:
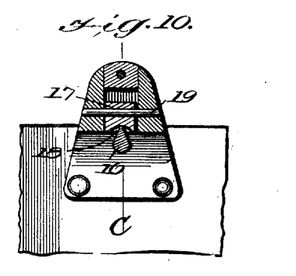
Fig. 10 is a cross section on the line 10—10 of Fig. 9.
Figure 11:
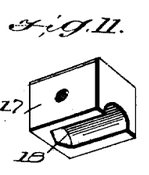
Fig. 11 is a perspective view of the bearing-block proper forming part of the aforesaid bearings.

The receiving hopper B is supported between, and rigidly secured to, vertical posts or standards 11, which serve also as fulcra for the weighing-beams or levers 12. These are arranged parallel and their front ends are rigidly connected by a horizontal bar 13, see Fig. 1. On the outer side of each weighing beam or lever 12 there is arranged a graduated bar 14 upon which is mounted a sliding weight 15. These bars and weights serve to balance the weighing-hopper C, as required. The weighing-hopper C is suspended from the shorter arms of the weighing beams 12, as shown in Figs. 3, 5, and the bearings are constructed as shown in detail in Figs. 9, 10, 11. Each of the beams 12 has an inwardly projecting knife-edge 16 and each of the ears attached to the weighing hopper is constructed in the form of a bracket within which is pivoted a bearing-block proper 17 that rests directly upon the said knife-edge 16. As shown in Figs. 9 and 11, such block 17 is cut out in its under side, save at one end, where the cavity is inclined as indicated at 18. In other words, the end of the groove in the underside of the bearing block 17 slopes from the upper edge outward. Such incline 18 is in contact with the angle of the knife-edge 16; and by this means the weighing hopper C is prevented from moving laterally. The inclines 18 of the bearing-blocks on the opposite sides of the weighing hopper thus serve to hold the latter in exactly the required position to balance and work most easily so that accurate weighing is insured. It is obvious that under any pressure the weighing hopper tends to adjust itself with reference to the knife-edges 16 since the inclines 18 will ride down or slide on the ends of the latter. The bearing-blocks 17 are pivoted centrally by a cross rod 19, see Figs. 9 and 10. They are thus adapted to oscillate in a lengthwise direction and thereby adjust themselves always to the knife edges in the required manner.

The bearings of the weighing beams or levers 12 in the vertical standards 11, are constructed substantially the same as the bearings just described, as will be seen by reference to Fig. 6, except that in this case, the knife-edge is uppermost instead of being under the bearing-block. The latter is indicated by 17$^a$ and the knife-edge by 16$^a$.

Figure 1:
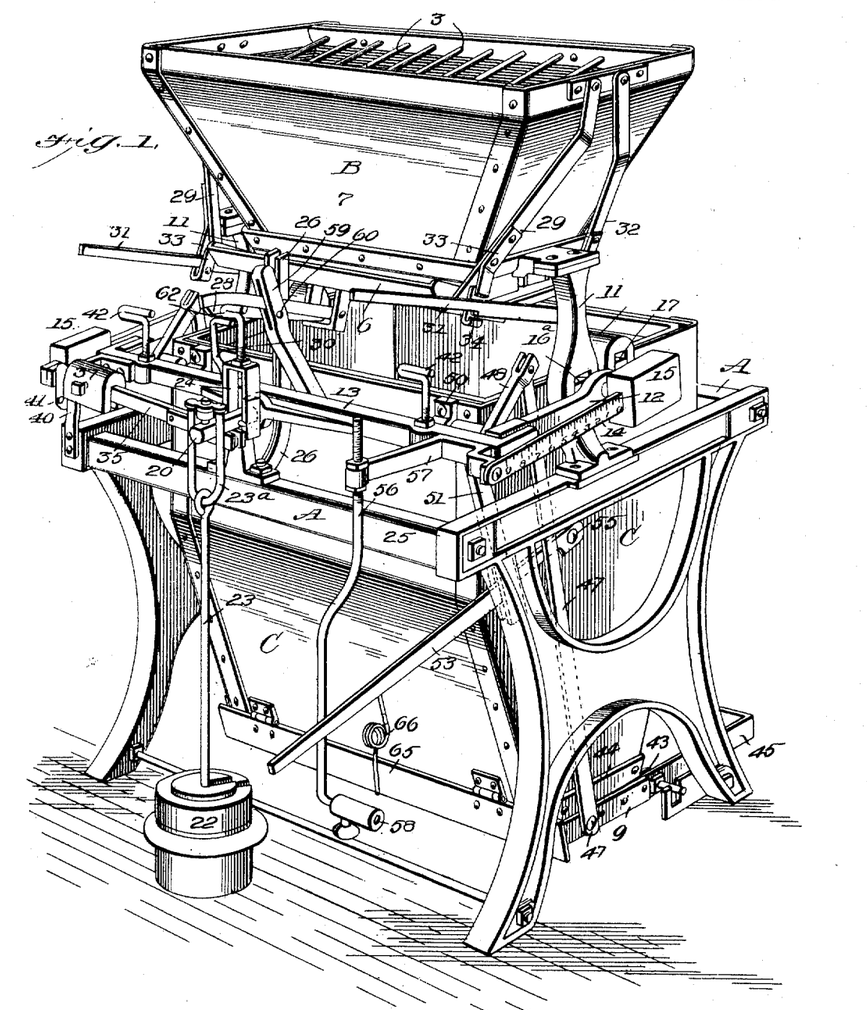
Figure 1 is a perspective view of the apparatus.

The front bar 13 connecting the weighing-beams or levers 12, is provided with a forward extension 20; see especially Figs. 1 and 2. The same is in the nature of a round bar which is inserted in a hole in the bar 13 and may, therefore, be adjusted lengthwise therein. It is clamped in any adjustment by means of a screw 21. The poise or weights 22 are hung on the rod 20 by means of a rod 23 and stirrup 23$^a$. The weights or poise 22 balances four times their weight in the weighing-hopper C. Thus a twenty-five pound weight constituting the poise will balance or weigh one hundred pounds in the hopper when the same is used as an ordinary scale, but will balance more when the scale is used to weigh automatically. The rod 20 from which the poise 22 is hung being adjustable lengthwise, it is obvious that by adjusting it, the leverage of the beams or levers 12 may be increased at will. The rod 20 projects through a slotted guide 24 which is supported on the frame bar 25 of the frame A. A curved standard 26, see Fig. 2, is attached to the same frame bar 25, and its slotted upper end is provided with a cross-pin 27. A latch bar 28, having a shoulder to engage the pin 27, is pivoted to the valve 6 of the smaller compartment of receiving-hopper B. The said valve is supported in a swinging pivoted stirrup 29 and when retracted or in the open position shown in Figs. 2 and 8, it is held by the latch 28, as will be readily understood. This latch is tripped by a device 30 consisting of a screw-threaded rod having its upper end bent at a right angle and supported adjustably by means of nuts in the front bar 13 of the weighing levers 12. As before stated, the valve 6 is open while the initial load is being received by the weighing-hopper C. When the initial load overcomes the poise sufficiently, it descends a little and hence the front bar 13 of the weighing levers is raised correspondingly, thus releasing the latch 28 from engagement with the pin 27 which allows the valve 6 to swing by gravity under the opening 8$^a$ of the smaller compartment 2, which position is indicated in Fig. 3. Up to this time, the valve 5 of the larger compartment 1 and hopper B has been closed, but it is now opened automatically by means of its connection with the larger valve 6. This connection is effected by means of latch bars 31 which are pivoted to its supporting stirrup 32, and slide in slotted keepers 33 attached to the stirrups 29 that support the valve 6. The bars 31 are shouldered and thus adapted to engage pins 34 that pass through said keepers 33; see especially Fig. 1. It will now be understood that when the valve 6 swings to the closed position, Fig. 3, the pins 34 come in contact with the shoulders of latches 31, and thus, through the medium of the latch bars, push the valve 5 back to the open position also shown in Fig. 3. In other words, in the beginning of the operation of the machine, the valves are located as shown in Fig. 2, the valves 5 being closed and the valve 6 being open, but when the initial load has been received in the weighing-hopper C, the downward movement of the latter trips the latch 28 of the valve 6 so that it swings by gravity to the closed position indicated in Fig. 3, and at the same time automatically opens the valve 5. In this manner discharge from the compartment 2 to hopper B is cut off and the discharge from the smaller compartment 1 through its narrow mouth 8 begins and constitutes what is commonly known as the dribble. The flow of this dribble continues up to a certain point, and then the weighing-hopper descending farther, its gate 9 is opened as will be presently described, so as to discharge its load.

It will be seen that the brush 10 prevents leak of either valve when closed, but is no hindrance to discharge from either compartment of the receiving hopper when either valve is open.

In further explanation of the operation of the valve with relation to the compartments of the receiving-hopper, it may be stated that, as the grain is spouted into compartment 1, the latter is filled and overflows, so that the only outlet from the receiving hopper as a whole is through the left-hand compartment 2. The grain flows from this compartment into the weighing hopper C until the weight is sufficient to cause the hopper to descend and thus release the valve 6, which then swings into closed position beneath the discharge opening of compartment 2, the said valve thus closing by its own weight. In this operation, the grain is evened up in the weighing hopper C, which allows the weight to plumb the hopper, whereby an advantage is attained. The grain first entering compartment 1, the force of the current of grain is obstructed or checked.

The arrangement of the rods 3 above the compartment 1 prevents trash getting into that portion of the grain which finishes up each weighing operation, or constitutes the "dribble," whereby a more uniform flow of the grain from the dribble compartment 1 is insured.

Figures 7, 8:
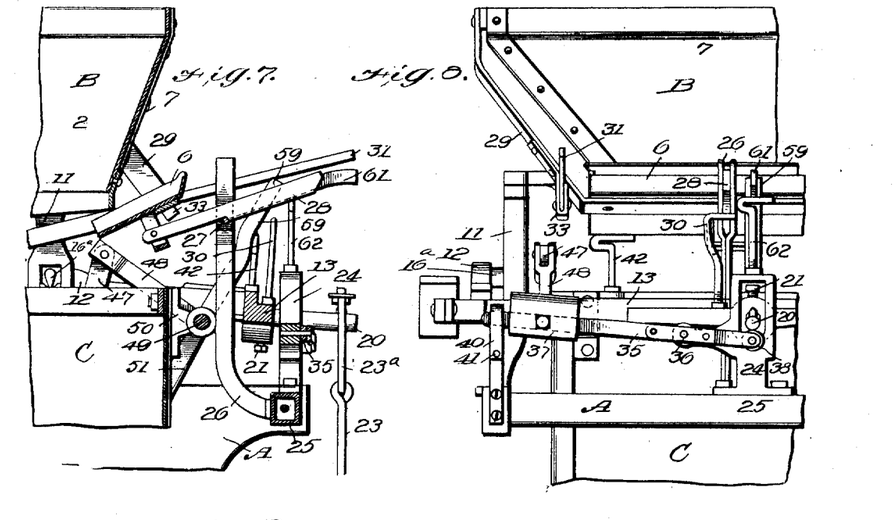
Fig. 7 is a vertical section showing the valve of the larger compartment of the receiving hopper in retracted or open position, as in the first stage of the operation of the machine.
Fig. 8 is a front view of a portion of the machine showing the position of the valve of the larger compartment when closed, and the weighing-hopper in the depressed position as when it has received its initial load.

We will now describe the means whereby the weighing-hopper C is enabled to descend slightly or make an initial downward movement, when the main portion of the load has been received by it, and is then held stationary until the complete load has been received. As shown in Figs. 1 and 8, a short lever 35 is pivoted at 36 to an arm of the slotted guide 24, and a slidable weight 37 is applied to its longer arm. An anti-friction roller 38 is pivoted in the end of its shorter arm and bears upward against the rod 20, which, as before described, forms a forward projection of the bar 13 that connects the weighing beams 12. It is obvious that, through this means, a certain upward lift or leverage is applied to the said rod 20, which tends to raise the beams 12 and allow a consequent and corresponding depression of the weighing-hopper. In other words, through the medium of the weighted lever 35, the weighing-hopper is allowed to descend before its complete load is received. The slidable weight 37 allows this movement to be controlled at will. The outer end of the lever 35 works in a slotted guide 40 attached to the front frame; see Figs. 1 and 8. A pin 41 in said guide serves as a stop to arrest the downward movement of the lever, so that it is brought to rest when it reaches a horizontal position, and it is obvious that it has then no further effect on the weighing-hopper.

We will now briefly describe the general operation of the machine so far as has been described.

The valves 5 and 6 of the receiving hopper B being in the position shown in Fig. 2, and the grain being run into the larger compartment 1, it is filled and overflows into the smaller one 2, and thence discharges into the weighing-hopper C, as indicated by dotted lines Fig. 12. When the bulk of the charge has been received by the weighing-hopper, the upward pressure or leverage of the weighted lever 35 upon the shaft or rod 20, constituting an attachment of the weighing levers, raises such levers until the lever 35 is arrested by the pin in its guide 40. This operation releases the valve 6 for the smaller compartment 1, since the latch 28 is then tripped by the adjustable trip 29, and such valve closes by gravity and at the same time automatically opens the smaller valve 5 of the larger compartment 1. The dribble from such compartment 1 then begins and continues to run until the weight of grain in the weighing-hopper over-balances the weight or poise 22 applied to the end of the weighing beams 12. When the beams rise, the shouldered latch-bars 31 of the dribble valve 5 are tripped and such valve closes and thus stops entirely the discharge from the hopper B into the weighing hopper; and this position is maintained until the weighing-hopper has been discharged of its load. The said latch-bars 31 are tripped by means of screw-threaded rods 42 forming an attachment of the front bar 13 of the weighing beams. The same being provided with nuts, they may be adjusted vertically as required to trip the latch-bars 31 and allow the valve 5 to close at exactly the right moment. The mechanism for securing and releasing the gate 9 of the weighing-hopper will now be described. Such gate is pivoted at 43 at one side of the mouth 44 of the weighing-hopper and is provided with laterally extended arms 45 to which a counterbalance weight 46 is applied, as indicated in Fig. 2. Links 47 connect the free end of the gate with the arm 48 of a horizontal rockshaft 49, which is journaled in brackets 50 attached to the upper front edge of the weighing-hopper. Another arm 51 is attached to the rock-shaft 49 and arranged at an obtuse angle to the arm 48, as shown in Fig. 5. The lower end of this arm 51 is slotted and provided with a cross-pin 52, having an anti-friction roller upon which a latch-bar 53 slides. This latch-bar is provided with a shoulder 54 and is pivoted at 55 to the side of the weighing-hopper. Since the arms 48, 51, are rigidly attached to the rock-shaft 49, and move with it, it is apparent that when the same are in the position indicated in Figs. 1, 3, 4, the gate 9 of the weighing hopper will be held closed or locked and that, upon release of the latch 53 from engagement of its shoulder with the pin 52 in the arm 51, the gate will be released and opened by the weight of the load, as indicated in Fig. 5. The gate will remain open until the load is wholly discharged, when its counter-balance 46 will restore it to the closed position indicated in Figs. 1 and 2. The tripping of the latch 53 to allow such release of the gate 9 is effected by a hanging trip 56, see Fig. 1, the same consisting of a bar which is screw-threaded at its upper end and attached to a forwardly projecting portion 57 of the front weighing beam 13. By means of nuts it is adjustable vertically as required. Its lower end is bent horizontally and provided with a slidable sleeve or collar 58, which is secured by a clamp-screw. It will be seen that when the load in the hopper C over-balances the poise 22, and the weighing beams 12 are consequently raised, the bent end of trip 56 is raised into contact with the free end of the hopper latch 53, and raises the same so as to release it from engagement with the pin 52 in lever arm 51. Thus the hopper gate 9 is automatically opened when the hopper C descends. The collar or sleeve 58 is made adjustable so that it may be moved laterally far enough to cause it to miss contact with the latch bar 53, whenever it is desired to hold a charge in the weighing-hopper for testing purposes, or whenever the machine is to be used as a bag scale. It will be seen that when the collar is set so as to miss the latch bar 53, a charge can be held in the hopper until the operator can put a bag in place so as to fill the bag, and thus the operation can be continued without danger of spilling a charge on the floor. The operator can then release the lock- or latch-bar 53 by hand.

As has been before stated, the two valves 5 and 6 are necessarily in the closed position shown in Fig. 5 when the weighing hopper is loaded and discharged by the opening of its gate 9. When the load has been discharged, the poise 22 raises the hopper C to its normal position and the counterbalance 46 of the hopper gate 9 closes the latter, and is so far automatically adjusted for repeating the weighing operation. It is necessary, however, in order to again fill the hopper C, that the larger valve 6 shall be opened, and this is effected automatically when the hopper-gate 9 closes. The mechanism for effecting this operation is as follows: A slotted lever arm 59 is secured to the rock-shaft 49, see Figs. 1 and 5, and said arm is provided with a cross-pin 60 which is arranged near the lower end of its slot. A shouldered latch bar 61 is pivoted to a bracket on the under side of the valve 6 and works slidably in the slot of the arm 59. When the gate 9 is open, the rock-shaft 49 is turned to the right so that the arm 59 is carried inward toward the bottom of the receiving-hopper B, as shown in Fig. 5, so that it offers no obstruction to the valve 6 closing when tripped automatically as has already been described; but when the gate 9 closes, the arm 59 is carried to the left, and, its pin 60 engaging the shoulder of latch 61, the latter is caused to draw the valve 6 back to the normal initial position shown in Figs. 1 and 2, when the locking latch 28 engaging the pin 27 of the vertical arm 26, locks it in the retracted or open position. When the lever arm 59 has reached the limit of its movement to the left, it comes in contact with and rides up on a rest 62, consisting of an angular screw-threaded rod that is supported by the slotted guide 24 forming a fixed attachment of the front bar 25 of the frame A. Thus, when the valve 6 is retracted to the open position, its latch 28 engages the pin 29 and the latch 61 is released from contact with the pin 60 of arm 59 by reason of its riding up on the rest 62. In this manner, the latch 61 is held in such position, that is to say, out of engagement with the pin 60, so that when the locking latch 28 of the valve 6 is tripped, the latch 61 will offer no impediment to the closing of the valve 6, its outer portion then riding safely over the pin 60 of arm 59. These movements take place when the hopper has received its initial load, as has been already described.

When the valve 6 closes automatically, the dribble valve 5 is simultaneously opened, as already described, by reason of its latch bars 31 engaging pins 34 in the swinging stirrup 29 that supports the valve 6. In other words, the gravity of this valve thus carries it inward to the closed position when released, and serves also to force the valve 5 open, as shown in Fig. 3. The latch bars 31 then rest upon vertically adjustable stops 42, which are attached to the front cross bar 13 of the weighing beams. Consequently, when the hopper makes its descending movement after the dribble has flowed for the requisite time and has filled it to the required weight, the descent of the hopper raises the weighing beams, and consequently the rests 64 carry the latch-bars 31 upward so that they free the pins and hence the valve 5 automatically swings to the closed position by gravity.

In order that the weighing-hopper C may be closed tightly, and at the same time with minimum friction of the gate 9 with adjacent parts, we provide a valve 65, see Figs. 1, 2, 5, the same consisting of a narrow metal plate which is hinged to the front side and lower edge of the hopper, and extends entirely across the same. It is held closed elastically by a coil spring 66 attached at one end to the hopper and the other pressing upon the valve. Thus the valve prevents the leak at the front of the gate 9, and, therefore, performs practically the same function for the gate that the brush 10 performs for the valves 5, 6, of the receiving-hopper.

When the bulk of the charge, that is to say, the initial load, is in the weighing-hopper C, the weighted lever 35 raises the scale beams until the pressure of the rod or shaft 20 on the short arm of said lever is removed and the lever is arrested in horizontal position by contact with the bottom of its slotted guide 40. It will be seen that this same lever 35 serves to partially arrest the downward movement of the shaft 20 when the hopper has been impeded and is again raised to the normal position. In other words, the weighted lever 35 breaks, to a certain degree, the blow of the weighing levers so that there is less shock to the machine. It will thus be seen that the weighted lever 35 has two functions.

When the weighing lever has received its initial load, and made its initial downward movement, the valve 6 of the smaller compartment of the receiving-hopper B is released by gravity, and at the same time the valve 5 of the larger compartment 1 is opened, and then the dribble begins and it continues to supply the weighing-hopper until the full load is received into it. Even if the discharge from the spout of the elevator were discontinued, the compartment 1 would still hold enough grain to insure a full dribble stream and the filling of the weighing-hopper C to the required degree. When the desired load has been received in the hopper C and it over-balances the weight 22 on the beams 12, the bar 13 is raised so that the latch-bars 31 are also raised, and release the valve 5, which then closes by gravity, so that the feed from the hopper B into the weighing hopper is entirely cut off; and, simultaneously, the trip 56 forming an attachment of the weighing beams being raised, the latch 53 is released, which in turn unlocks the gate 9 and the load of the weighing hopper discharges.

By setting the weight 37 on the lever 35, the weight 37 being adjustable, it is practicable to make the weighing beam rest a longer or shorter time after releasing the valve 6, which as before stated, when it closes upon the dribble valve 5. Thus if we desire the dribble to run three seconds, the weight 37 can be adjusted so as to accomplish this; or, if we desire it to run only two seconds, we move it toward the roller end of the lever. If, however, we desire it to run longer, say four or five seconds, the weight is moved in the opposite direction. The time that the dribble runs will not affect the accuracy of the weighing, provided the weighing beams 12 rest long enough to become steady. In practice, the bars 14 attached to the outer sides of the weighing beams 12 are graduated in opposite directions, that is to say, on one bar the numbers run toward the front, and on the other side they run from the front. The object of this is to determine the weight of the dribble stream, and to correct the overflow weight caused by this stream, which is necessarily in the air at each operation of the machine. Thus suppose, it is desired to weigh one hundred pounds of grain or other commodity, the one-hundred-pound weight is put on the poise 22 (as before stated the adjustment is such that it will be actually a twenty-five-pound weight), and we set the weights 15 on the graduated bars 14 at zero, by which one of the weights is placed at the front end and the other at the back end of the respective bars. We then move the adjustable trip collar 58 on trip 56 so that it will miss contact with the locking-bar 31 of the weighing-hopper. Grain is then run in until the feed is stopped automatically. There is now in the weighing hopper C a full charge, also the suspended stream, and these combined of course outweigh the one hundred pounds required for the charge. In order to find out how much there is of excess over the hundred pounds, we move forward the weight 15 which is farthest back, until the beam is in counterbalance which is shown by a pointer on the beam shaft 20 pointing to the mark on the side of the slotted guide 24. Let it be supposed that the weight 15 has been moved to the mark 5 to make it balance. Then five pounds is the weight of the suspended stream; thus making 105 pounds at each weighing instead of one hundred pounds. To correct this, we set the weight that was previously adjusted, back to zero and set the weight on the other graduated lever back to 5, which of course reduces the weight five pounds, so that the weighing will now be an even one hundred pounds.

What we claim is:

1. In a weighing machine of the type indicated, a receiving hopper provided with a transverse partition of less height than the body of the hopper, thus forming two adjacent compartments having different discharge openings, and a skeleton guard arranged over one of the compartments and inclined downward toward the other so as to convey trash thereinto, substantially as shown and described.

2. In a weighing scale of the type indicated, the combination with a weighing-hopper pivoted and adapted to move vertically, and a fixed receiving-hopper arranged over the former and having two separate compartments with separate discharge openings, valves pivoted and adapted to swing under the respective compartments of the receiving-hopper, and means for operatively connecting the valves with the weighing-hopper and for locking and releasing the same, whereby grain delivered into the hopper is discharged from the larger compartment 2 whose valve then closes, while the valve 5 of the other compartment 1 is simultaneously opened, as shown and described.

3. The combination with a weighing-hopper and a receiving hopper arranged above the same and provided with two compartments, the discharge opening of one being directly above the center of the weighing-hopper and the other having an outer side arranged at a vertical inclination whose plane extended downward would pass through the middle of the weighing-hopper, whereby grain or other commodity is discharged from each of the compartments into the center of the weighing-hopper, substantially as described.

4. The combination with a weighing-hopper and a receiving hopper arranged above the same and provided with two compartments having separate but contiguous discharge openings, of a brush arranged transversely beneath the receiving hopper and between the said openings, and swinging valves arranged for controlling the flow from the respective compartments and adapted, when in closed position to engage the brush from opposite sides, so that the inner open edges of the valves are thus closed by the brush, as shown and described.

5. The combination with a vertically movable weighing hopper, weighing beams from which it is suspended, a fixed receiving hopper arranged over the other and having two compartments with separate discharge openings, swinging valves for closing the respective openings, a latch bar pivoted to one valve and adapted to engage the other valve when the latter is in the open position, a latch bar pivoted to the last-named valve and a fixed member with which such latch bar engages when the said valve is in the open position, a trip attached to the weighing beams and adapted for engagement with the last-named latch bar, whereby when the weighing hopper descends with its initial load the latch bar of the open valve is tripped so that the latter is then free to swing to the closed position and by its engagement with the opposite valve forcing the same open by means of the latch bars, as shown and described.

6. The combination with the receiving hopper having separate compartments and discharge openings, of two swinging valves one for each compartment, means for holding one of the valves open and for tripping the same so that it may swing by gravity to closed position, the other valve having latch-bars which engage the first-named valve when the latter is in the open position, said latch-bars thus serving to force open the valve with which they are connected when the opposite valve swings to the closed position, substantially as described.

7. The combination with a vertically movable weighing-hopper, pivoted weighing-beams from which it is suspended, and a fixed receiving hopper arranged over the weighing hopper and provided with separate compartments having separate discharge openings, swinging valves for closing the respective openings, latch-bars pivoted to the respective valves, and trips connected with the weighing-beams for operating the respective latch-bars when the weighing-hopper descends, one valve being tripped in advance of the other, as when the weighing-hopper receives its initial load, substantially as described.

8. The combination with a vertically movable weighing-hopper, weighing-beams from which it is suspended, and a receiving hopper fixed over the other, of a swinging gate for closing the weighing-hopper, and a swinging valve for closing the receiving hopper, a latch-bar connected with said valve, a fixed member for engaging such latch-bar when the valve is in the open position, and mechanism connected with the gate of the weighing-hopper and serving to open the valve when the gate is closed, substantially as described.

9. The combination with the vertically movable weighing-hopper, pivoted weighing-beams from which it is suspended, a receiving hopper fixed over the weighing hopper, a swinging valve for closing the receiving hopper, of a latch-bar pivoted thereto, a pivoted swinging gate for closing the weighing-hopper, a rock-shaft pivoted horizontally on the latter and provided with divergent arms, a link connecting one of said arms with the gate of the weighing-hopper, and the other arm being adapted for engagement with the latch-bar of the valve, whereby, when the gate swings to the closed position after the discharge of the load, the valve is retracted to the open position, substantially as described.

10. The combination with a weighing-hopper and pivoted weighing-beams from which it is suspended, a pivoted swinging gate for such hopper, a rock-shaft pivoted on the upper portion of the hopper and having divergent arms, a link connecting one of said arms with the gate, a latch-bar pivoted to the hopper and engaging the other arm when the gate is in the closed position, and a trip suspended from the weighing-beam whereby, when the hopper descends with its complete load, the latch-bar is tripped and the gate allowed to open for discharge of the load, substantially as described.

11. The combination with a weighing-hopper and pivoted weighing-beams from which it is suspended, a pivoted swinging gate for such hopper, a rock-shaft pivoted on the upper portion of the hopper and having divergent arms, a link connecting one of said arms with the gate, a latch-bar pivoted to the hopper and engaging the other arm when the gate is in the closed position, a trip suspended from the weighing-beam and having a horizontal arm, an adjustable collar which is slidable on such arm, and means for clamping it in any adjustment, whereby it may be set in position for engaging the aforesaid latch-bar or for avoiding engagement therewith, substantially as described.

ANGUS McLEOD.
ALEXANDER THOMAS McLEOD.

Witnesses:
HOMER C. WAGNER,
ALVIN B. HOBLIT.